United States Patent
Seonwoo et al.

(10) Patent No.: US 12,332,939 B2
(45) Date of Patent: Jun. 17, 2025

(54) VIRTUAL KNOWLEDGE GRAPH CONSTRUCTION FOR ZERO-SHOT DOMAIN-SPECIFIC DOCUMENT RETRIEVAL

(71) Applicant: ADOBE INC., San Jose, CA (US)

(72) Inventors: Yeon Seonwoo, Daejeon (KR); Seunghyun Yoon, San Jose, CA (US); Trung Huu Bui, San Jose, CA (US); Franck Dernoncourt, San Jose, CA (US); Roger K. Brooks, Palo Alto, CA (US); Mihir Naware, Redwood City, CA (US)

(73) Assignee: ADOBE INC., San Jose, CA (US)

(*) Notice: Subject to any disclaimer, the term of this patent is extended or adjusted under 35 U.S.C. 154(b) by 8 days.

(21) Appl. No.: 17/808,599

(22) Filed: Jun. 24, 2022

(65) Prior Publication Data

US 2023/0418868 A1  Dec. 28, 2023

(51) Int. Cl.
*G06F 16/90* (2019.01)
*G06F 16/901* (2019.01)
*G06F 16/903* (2019.01)
*G06F 16/9038* (2019.01)
*G06F 16/93* (2019.01)

(52) U.S. Cl.
CPC .... *G06F 16/9024* (2019.01); *G06F 16/90335* (2019.01); *G06F 16/9038* (2019.01); *G06F 16/93* (2019.01)

(58) Field of Classification Search
CPC .......... G06F 16/9024; G06F 16/90335; G06F 16/9038; G06F 16/93; G06F 16/313
See application file for complete search history.

(56) References Cited

U.S. PATENT DOCUMENTS 8,458,487 B1 * 6/2013 Palgon .................. G06F 21/00
713/193
9,436,760 B1 * 9/2016 Tacchi ................ G06F 16/9024
(Continued)

OTHER PUBLICATIONS

1Dhingra, et all, "Differentiable Reasoning Over a Virtual Knowledge Base", in ICLR, arXiv preprint:arXiv:2002.10640v1 [cs.CL] Feb. 25, 2020, 16 pages.
(Continued)

*Primary Examiner* — Merilyn P Nguyen
(74) *Attorney, Agent, or Firm* — F. CHAU & ASSOCIATES, LLC

(57) ABSTRACT

Systems and methods for text processing are described. Embodiments of the present disclosure receive a query comprising a natural language expression; extract a plurality of mentions from the query; generate a relation vector between a pair of the plurality of mentions using a relation encoder network, wherein the relation encoder network is trained using a contrastive learning process where mention pairs from a same document are labeled as positive samples and mention pairs from different documents are labeled as negative samples; combine the plurality of mentions with the relation vector to obtain a virtual knowledge graph of the query; identify a document corresponding to the query by comparing the virtual knowledge graph of the query to a virtual knowledge graph of the document; and transmit a response to the query, wherein the response includes a reference to the document.

20 Claims, 12 Drawing Sheets

(56) References Cited

U.S. PATENT DOCUMENTS

| | | | |
|---|---|---|---|
| 11,573,955 B1* | 2/2023 | James | G06F 16/2228 |
| 2002/0111941 A1* | 8/2002 | Roux | G06F 16/3344 |
| 2011/0035403 A1* | 2/2011 | Ismalon | G06F 16/487 |
| | | | 707/769 |
| 2016/0246885 A1* | 8/2016 | Aravamudhan | G06F 16/9535 |
| 2019/0026361 A1* | 1/2019 | Doh | G06F 16/24578 |
| 2019/0361966 A1* | 11/2019 | Munro | G06F 16/24532 |
| 2019/0392066 A1* | 12/2019 | Kim | G06F 16/24578 |
| 2020/0159867 A1* | 5/2020 | Sharma | G06F 16/3347 |
| 2020/0250239 A1* | 8/2020 | Huang | G06F 16/3347 |
| 2021/0173841 A1* | 6/2021 | Kotnis | G06F 16/322 |
| 2021/0182662 A1* | 6/2021 | Lai | G06F 40/284 |
| 2021/0217504 A1* | 7/2021 | Fang | G06F 40/30 |
| 2021/0248376 A1* | 8/2021 | Zhao | G06V 20/49 |
| 2021/0294829 A1* | 9/2021 | Bender | G16H 70/60 |
| 2022/0050847 A1* | 2/2022 | Scebold | G06F 16/9032 |
| 2022/0129770 A1* | 4/2022 | Mihindukulasooriya | |
| | | | G06N 3/08 |
| 2022/0147550 A1* | 5/2022 | Winzenried | G06F 16/338 |
| 2022/0318505 A1* | 10/2022 | Pouran Ben Veyseh | |
| | | | G06F 40/126 |
| 2023/0169361 A1* | 6/2023 | Mitra | G06N 3/006 |
| | | | 706/12 |
| 2023/0196748 A1* | 6/2023 | Hariharan | G06V 30/10 |
| | | | 382/103 |

OTHER PUBLICATIONS

2Karpukhin, et al., "Dense Passage Retrieval for Open-Domain Question Answering", In Proceedings of the 2020 Conference on Empirical Methods in Natural Language Processing, pp. 6769-6781, November 16-20, 2020.

3Kwiatkowski, et al., "Natural Questions: A Benchmark for Question Answering Research", Transactions of the Association for Computational Linguistics, vol. 7, pp. 453-466, 2019.

4Liu, et al., "RoBERTa: A Robustly Optimized BERT Pretraining Approach", arXiv preprint: arXiv:1907.11692v1 [cs.CL] Jul. 26, 2019, 13 pages.

5Mintz, et al., "Distant supervision for relation extraction without labeled data", In ACL, 2009, 9 pages.

6Soares, et al., "Matching the Blanks: Distributional Similarity for Relation Learning", In Proceedings of the 57th Annual Meeting of the Association for Computational Linguistics, pp. 2895-2905, 2019.

7Sun, et al., "Reasoning Over Virtual Knowledge Bases With Open Predicate Relations", In ICML, 2021, 12 pages.

8Thakur, et al., "BEIR: A Heterogeneous Benchmark for Zero-shot Evaluation of Information Retrieval Models", In 35th Conference on Neural Information Processing Systems (NeurIPS 2021) Track on Datasets and Benchmarks Track, 16 pages.

* cited by examiner

VIRTUAL KNOWLEDGE GRAPH CONSTRUCTION FOR ZERO-SHOT DOMAIN-SPECIFIC DOCUMENT RETRIEVAL

BACKGROUND

The following relates generally to natural language processing. Natural language processing (NLP) refers to using computers to interpret or generate natural language. In some cases, NLP tasks involve assigning label data such as grammatical information to words or phrases within a natural language expression. Some NLP systems use neural networks or statistical models which make soft, probabilistic decisions based on attaching real-valued weights to input features. These models can express the relative probability of multiple answers. A variety of different classes of machine-learning algorithms have been applied to NLP tasks. For example, document indexing and retrieval is a field within NLP that involves identifying a relevant document from candidate documents based on an input query. In some examples, document retrieval can be deployed in question answering applications.

However, conventional document retrieval systems are not able to represent complex knowledge in a domain-specific document (e.g., documents that have specialized terminology or specialty knowledge). Therefore, there is a need in the art for an improved document retrieval system that can efficiently model relationships between a query and candidate documents to increase document retrieval performance.

SUMMARY

The present disclosure describes systems and methods for text processing and document retrieval. Embodiments of the present disclosure include a text processing apparatus configured to receive a query and identify a relevant document corresponding to the query from a set of candidate documents. In some embodiments, a machine learning model is trained to construct a virtual knowledge graph (VKG) for a query and a collection of documents (i.e., corpus). In some cases, a VKG is a graph representation that encompasses a set of entities and the corresponding relations among the set of entities. A relation encoder network is configured to generate a relation vector between a pair of a set of mentions. A training component of the text processing apparatus trains a machine learning model where relation vectors between mentions from the same document are used as positive samples for a contrastive learning process (i.e., pairs from different documents are the negative samples). This way, the contrastive learning process, via the training component, trains the machine learning model to encode aspects of the document in the relation vectors, which enables an indexing system to match documents to related queries.

A method, apparatus, and non-transitory computer readable medium for text processing are described. One or more embodiments of the method, apparatus, and non-transitory computer readable medium include receiving a query comprising a natural language expression; extracting a plurality of mentions from the query; generating a relation vector between a pair of the plurality of mentions using a relation encoder network, wherein the relation encoder network is trained using a contrastive learning process where mention pairs from a same document are labeled as positive samples and mention pairs from different documents are labeled as negative samples; combining the plurality of mentions with the relation vector to obtain a virtual knowledge graph of the query; identifying a document corresponding to the query by comparing the virtual knowledge graph of the query to a virtual knowledge graph of the document; and transmitting a response to the query, wherein the response includes a reference to the document.

A method, apparatus, and non-transitory computer readable medium for training a machine learning model are described. One or more embodiments of the method, apparatus, and non-transitory computer readable medium include receiving a training set including a plurality of documents; extracting a plurality of mentions from the plurality of documents; generating a relation vector between a pair of the plurality of mentions in each document using a relation encoder network; and updating parameters of the relation encoder network based on the relation vector using a contrastive learning process where mention pairs from a same document are labeled as positive samples and mention pairs from different documents are labeled as negative samples.

An apparatus and method for text processing are described. One or more embodiments of the apparatus and method include a mention extraction component configured to extract a plurality of mentions from a query; a relation encoder network configured to generate a relation vector between a pair of the plurality of mentions, wherein the relation encoder network is trained using a contrastive learning process where mention pairs from a same document are labeled as positive samples and mention pairs from different documents are labeled as negative samples; a graph component configured to combine the plurality of mentions with the relation vector to obtain a virtual knowledge graph of the query; and a document retrieval component configured to identify a document corresponding to the query by comparing the virtual knowledge graph of the query to a virtual knowledge graph of the document.

DETAILED DESCRIPTION

Figure 1:
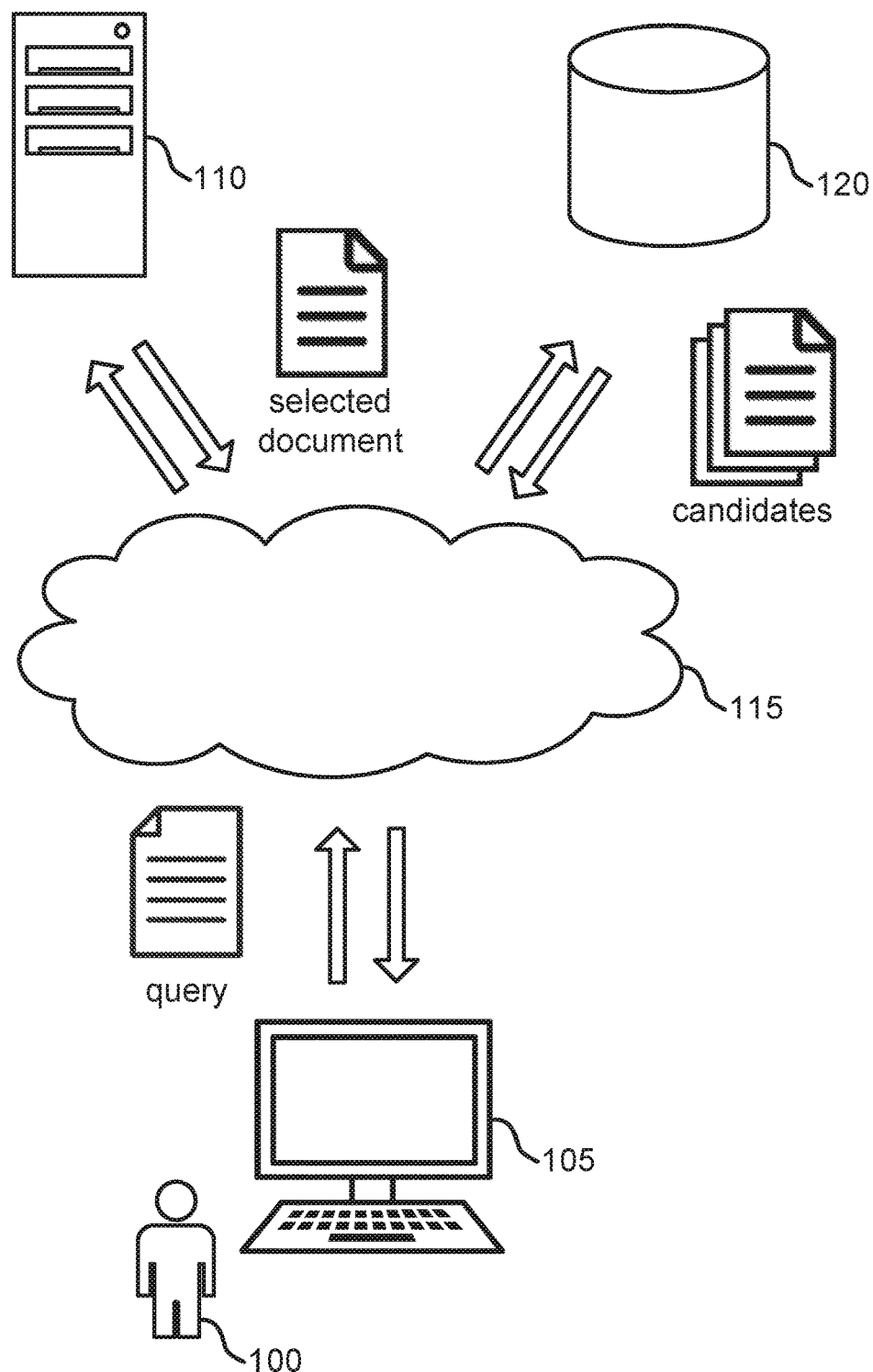
FIG. 1 shows an example of a text processing system according to aspects of the present disclosure.

The present disclosure describes systems and methods for text processing and document retrieval. Embodiments of the present disclosure include a text processing apparatus configured to receive a query and identify a relevant document corresponding to the query from a set of candidate documents. In some embodiments, a machine learning model is trained to construct a virtual knowledge graph (VKG) for a query and a collection of documents (i.e., corpus), where a VKG is a graph representation that encompasses a set of entities and the corresponding relations among the set of entities.

Conventional document retrieval systems embed a document into a single vector to represent the content of the document such as entities and their relations. However, a single vector is insufficient to cover complex knowledge in a domain-specific document. Queries and documents in a specific domain often have terminologies and specialty knowledge that are not adequately represented in open-domain or general documents. Additionally, unlike some embodiments of the present disclosure, conventional training methods cannot handle the complexity of knowledge in domain-specific documents. In some examples, domain-specific documents are frequently updated (e.g., software manuals are updated when a newer version update is available). Accordingly, it is costly to maintain datasets to train document retrieval systems.

Embodiments of the present disclosure include a text processing apparatus configured to construct a virtual knowledge graph of a query (i.e., query VKG), virtual knowledge graphs for documents (i.e., document VKGs) and retrieve a document by comparing the query VKG and document VKGs. That is, the text processing apparatus represents a query and a set of candidate documents (i.e., corpus) into a knowledge graph of entities and corresponding relations. Then, the text processing apparatus computes the relevance between queries and documents based on the graph representation to find a relevant document. In some examples, the query includes a natural language expression (e.g., a document, a passage, a paragraph, etc.). The text processing apparatus transmits a response to the query, where the response includes a reference to the document.

In some examples, a VKG is a graph representation of a document (e.g., query, corpus) and the VKG includes entities and the corresponding relations among the entities. The relation between two entities is represented by a relation vector in the VKG. The VKG is applied to retrieving a relevant document (e.g., domain-specific document retrieval). A relation encoder network of the text processing apparatus is configured to generate a relation vector between a pair of the set of mentions. In some cases, mention is a text segment that refers to an entity (i.e., mention of entity). For example, entity "John" may appear multiple times in a document and text segments that refer to "John" may be identified as mentions of the entity "John".

According to at least one embodiment of the present disclosure, the text processing apparatus includes a training component configured to train the relation encoder network using a contrastive learning process where mention pairs from a same document are labeled as positive samples and mention pairs from different documents are labeled as negative samples. That is, the training component trains a machine learning model where relation vectors between mentions from the same document are used as positive samples for a contrastive learning process (i.e., pairs from different documents are the negative samples). This way, the machine learning model can be trained to encode aspects of the document in the relation vectors, which enables an indexing system to match documents to related queries.

According to some embodiments, the training component, using a distant-supervision method, constructs VKGs from domain-specific documents. Distant-supervision methods heuristically annotate mention pairs in the same relation and train the relation encoder network to maximize the similarity between mention pairs in the same relation. In some cases, mention pairs are often in different relations, and the relation varies depending on the context of a document. Relation encoder network can be trained to predict similar relation vectors for mention pairs with the same entity pair even they are in different relations. That is, embodiments of the present disclosure are not limited to assuming mention pairs are in the same relation if they share the same entity pair.

According to some embodiments of the present disclosure, training methods herein are not dependent on human-annotated datasets or human-engaged validation process for constructing VKGs. In some examples, a VKG is constructed from plain text (e.g., Wikipedia corpus, domain-specific corpus). This way, the text processing apparatus can be used as a zero-shot question answering system that retrieves answer documents given a user query. Because the text processing apparatus does not depend on question answer annotation labels, the cost for preparing datasets and the time for annotation is decreased.

Embodiments of the present disclosure may be used in the context of question answering and document retrieval applications. For example, a text processing network based on the present disclosure may take a query and efficiently identify a document corresponding to the query for users. An example application according to embodiments of this disclosure is provided with reference to FIG. 5. Details regarding the architecture of an example text processing apparatus are provided with reference to FIGS. 1-4. Example processes for text processing are provided with reference to FIGS. 6-10. Example training processes are described with reference to FIGS. 11-12.

Network Architecture

In FIGS. 1-4, an apparatus and method for text processing are described. One or more embodiments of the apparatus and method include a mention extraction component configured to extract a plurality of mentions from a query; a relation encoder network configured to generate a relation vector between a pair of the plurality of mentions, wherein the relation encoder network is trained using a contrastive learning process where mention pairs from a same document are labeled as positive samples and mention pairs from different documents are labeled as negative samples; a graph component configured to combine the plurality of mentions with the relation vector to obtain a virtual knowledge graph of the query; and a document retrieval component configured to identify a document corresponding to the query by comparing the virtual knowledge graph of the query to a virtual knowledge graph of the document.

Some examples of the apparatus and method further include a training component configured to compute a contrastive learning loss and to update parameters of the relation encoder network based on the contrastive learning loss. Some examples of the apparatus and method further include a filter component configured to select a plurality of candidate documents from a collection of documents based on a bag-of-words analysis. Some examples of the apparatus and method further include a document search interface configured to receive the query from a user and to display the document. In some aspects, the relation encoder network comprises a transformer architecture.

FIG. 1 shows an example of a text processing system according to aspects of the present disclosure. The example shown includes user 100, user device 105, text processing apparatus 110, cloud 115, and database 120. Text processing apparatus 110 is an example of, or includes aspects of, the corresponding element described with reference to FIG. 2.

As an example shown in FIG. 1, user 100 provides a query comprising a natural language expression. In some examples, the query is a document, a passage, a paragraph, etc. The query is transmitted to text processing apparatus 110, e.g., via user device 105 and cloud 115. Text processing apparatus 110 extracts a set of mentions from the query.

Text processing apparatus 110 generates a relation vector between a pair of the set of mentions. Text processing apparatus 110 is trained using a contrastive learning process where mention pairs from a same document are labeled as positive samples and mention pairs from different documents are labeled as negative samples. Text processing apparatus 110 combines the set of mentions with the relation vector to obtain a virtual knowledge graph of the query.

Text processing apparatus 110 filters a collection of documents and retrieves candidate documents from database 120. Text processing apparatus 110 locates a most relevant document corresponding to the query by comparing the virtual knowledge graph of the query to a virtual knowledge graph of the document. Text processing apparatus 110 transmits a response to the query to user 100 via user device 105. The response includes a reference to the document.

User device 105 may be a personal computer, laptop computer, mainframe computer, palmtop computer, personal assistant, mobile device, or any other suitable processing apparatus. In some examples, user device 105 includes software that incorporates a text processing application (e.g., a question answering application). In some examples, the text processing application on user device 105 may include functions of text processing apparatus 110.

In some embodiments, user device 105 includes a document search interface configured to receive the query from a user and to display the document. The document search interface transmits a response to the query, where the response includes a reference to the document. In some examples, the document search interface receives an input from a user where the query is based on the input. The document search interface displays the response.

A user interface may enable user 100 to interact with user device 105. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a user interface may be represented in code which is sent to the user device and rendered locally by a browser.

Text processing apparatus 110 includes a computer implemented network comprising a mention extraction component, a relation encoder network, a graph component, a document retrieval component, a filter component, and a document search interface. Text processing apparatus 110 may also include a processor unit, a memory unit, an I/O module, and a training component. The training component is used to train a machine learning model (or a text processing network). Additionally, text processing apparatus 110 can communicate with database 120 via cloud 115. In some cases, architecture of the text processing network is also referred to as a network or a network model. Further detail regarding the architecture of text processing apparatus 110 is provided with reference to FIGS. 1-4. Further detail regarding the operation of text processing apparatus 110 is provided with reference to FIGS. 5-10.

In some cases, text processing apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

Database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user interacts with database controller. In other cases, database controller may operate automatically without user interaction.

Figure 2:
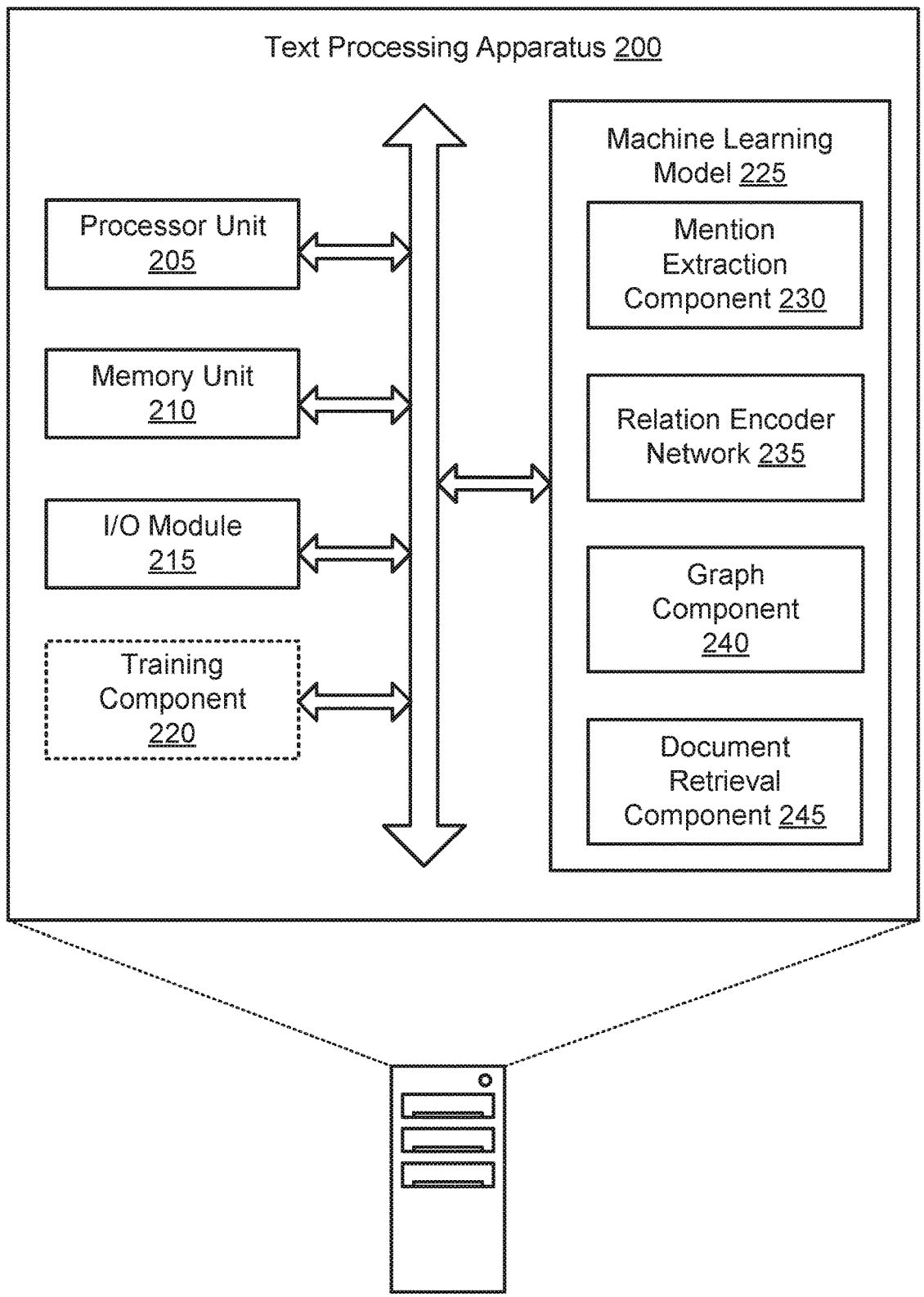
FIG. 2 shows an example of a text processing apparatus according to aspects of the present disclosure.

FIG. 2 shows an example of a text processing apparatus 200 according to aspects of the present disclosure. The example shown includes text processing apparatus 200, processor unit 205, memory unit 210, I/O module 215, training component 220, and machine learning model 225. Text processing apparatus 200 is an example of, or includes aspects of, the corresponding element described with reference to FIG. 1. Machine learning model 225 is an example of, or includes aspects of, the corresponding element described with reference to FIG. 4. In an embodiment, machine learning model 225 includes mention extraction component 230, relation encoder network 235, graph component 240, and document retrieval component 245.

Processor unit 205 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 205 is configured to operate a memory array using a memory controller. In other cases, a memory controller is integrated into the processor. In some cases, processor unit 205 is configured to execute computer-readable instructions stored in a memory to perform various functions. In some embodiments, processor unit 205 includes special purpose components for modem processing, baseband processing, digital signal processing, or transmission processing.

Examples of memory unit 210 include random access memory (RAM), read-only memory (ROM), or a hard disk. Examples of memory unit 210 include solid state memory and a hard disk drive. In some examples, memory unit 210 is used to store computer-readable, computer-executable software including instructions that, when executed, cause a processor to perform various functions described herein. In some cases, memory unit 210 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within memory unit 210 store information in the form of a logical state. I/O module 215 (e.g., an input/output interface) may include an I/O controller. An I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an IO controller.

In some examples, I/O module 215 includes a user interface. A user interface may enable a user to interact with a device. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a communication interface operates at the boundary between communicating entities and the channel and may also record and process communications. Communication interface is provided herein to enable a processing system coupled to a transceiver (e.g., a transmitter and/or a receiver). In some examples, the transceiver is configured to transmit (or send) and receive signals for a communications device via an antenna.

According to some embodiments of the present disclosure, text processing apparatus 200 includes a computer implemented artificial neural network (ANN) for generating a relation vector between a pair of a set of mentions. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

According to some embodiments, training component 220 receives a training set including a set of documents. In some examples, training component 220 updates parameters of relation encoder network 235 based on the relation vector using a contrastive learning process where mention pairs from a same document are labeled as positive samples and mention pairs from different documents are labeled as negative samples.

In some examples, training component 220 identifies a positive sample pair including a first mention pair and a second mention pair from a first document. Training component 220 identifies a negative sample pair including the first mention pair from the first document and a third mention pair from a second document. Training component 220 computes a contrastive learning loss based on the positive sample pair and negative sample pair, where the parameters of the relation encoder network 235 are updated based on the contrastive learning loss. In some examples, training component 220 computes a first dot product of relation vectors representing the positive sample pair. Training component 220 computes a second dot product of relation vectors representing the negative sample pair, where the contrastive learning loss is computed based on the first dot product and the second dot product.

In some examples, training component 220 receives ground truth training data associating the pair of the set of mentions with a common entity. Training component 220 computes a cross-entropy loss based on the relation vector and the ground truth training data, where the parameters of relation encoder network 235 are updated based on the cross-entropy loss.

According to some embodiments, training component 220 is configured to compute a contrastive learning loss and to update parameters of relation encoder network 235 based on the contrastive learning loss. In some examples, training component 220 is part of another apparatus other than text processing apparatus 200.

According to some embodiments, mention extraction component 230 extracts a set of mentions from the query. In some examples, mention extraction component 230 identifies a text delimiter. Mention extraction component 230 divides the query into a set of spans based on the text delimiter. Mention extraction component 230 computes an entity score for each of the set of spans. In some examples, mention extraction component 230 selects the set of mentions based on the entity score for each of the set of spans. In some examples, each of the set of mentions includes a document index, a start index, an end index, and a corresponding entity.

According to some embodiments, mention extraction component 230 extracts a set of mentions from the set of documents. Mention extraction component 230 is an example of, or includes aspects of, the corresponding element described with reference to FIG. 3.

According to some embodiments, relation encoder network 235 generates a relation vector between a pair of the set of mentions (i.e., a mention pair), where relation encoder network 235 is trained using a contrastive learning process where mention pairs from a same document are labeled as positive samples and mention pairs from different documents are labeled as negative samples. In some examples, relation encoder network 235 determines that the mention pair corresponds to a same entity based on the relation vector. In some examples, relation encoder network 235 determines that the mention pair corresponds to different entities based on the relation vector.

In some examples, relation encoder network 235 identifies the pair from the set of mentions, where the pair includes a first mention and a second mention. Relation encoder network 235 masks the first mention and the second mention using a first entity token and a second entity token, respectively. Relation encoder network 235 inserts a head token adjacent to the first mention and a tail token adjacent to the second mention, where the relation vector is generated based on the first entity token, the second entity token, the head token, and the tail token.

In some examples, relation encoder network 235 includes a transformer architecture. Transformer or transformer network is a type of neural network models used for natural language processing tasks. A transformer network transforms one sequence into another sequence using an encoder and a decoder. Encoder and decoder include modules that can be stacked on top of each other multiple times. The modules comprise multi-head attention and feed forward layers. The inputs and outputs (target sentences) are first embedded into an n-dimensional space. Positional encoding of the different words (i.e., give every word/part in a sequence a relative position since the sequence depends on the order of its elements) is added to the embedded representation (n-dimensional vector) of each word. In some examples, a transformer network includes attention mechanism, where the attention looks at an input sequence and decides at each step which other parts of the sequence are important.

The attention mechanism involves query, keys, and values denoted by Q, K, and V, respectively. Q is a matrix that contains the query (a vector representation of one word in the sequence), K are the keys (vector representations of all the words in the sequence) and V are the values (vector representations of all the words in the sequence). For the encoder and decoder, multi-head attention modules, V consists of the same word sequence than Q . However, for the attention module that is taking into account the encoder and the decoder sequences, V is different from the sequence represented by Q. In some cases, values in V are multiplied and summed with some attention-weights a. Relation encoder network 235 is an example of, or includes aspects of, the corresponding element described with reference to FIGS. 3 and 4.

According to some embodiments, graph component 240 combines the set of mentions with the relation vector to obtain a virtual knowledge graph of the query. In some examples, the virtual knowledge graph of the query includes a set of nodes corresponding to the set of mentions and an edge corresponding to the relation vector. In some examples, the edge includes a head mention, a tail mention, and the relation vector. Graph component 240 is an example of, or includes aspects of, the corresponding element described with reference to FIG. 3.

According to some embodiments, document retrieval component 245 identifies a document corresponding to the query by comparing the virtual knowledge graph of the query to a virtual knowledge graph of the document. In some examples, document retrieval component 245 identifies matching mentions in the query and the document based on the virtual knowledge graph of the query and the virtual knowledge graph of the document. Document retrieval component 245 computes a similarity score for the query and the document based on the matching mentions, where the document is identified based on the similarity score.

In some examples, document retrieval component 245 computes a candidate knowledge graph for each of a set of candidate documents. Document retrieval component 245 compares the virtual knowledge graph of the query to the candidate knowledge graph for each of the set of candidate documents, where the document is identified based on the comparison. Document retrieval component 245 is an example of, or includes aspects of, the corresponding element described with reference to FIG. 3.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

Figure 3:
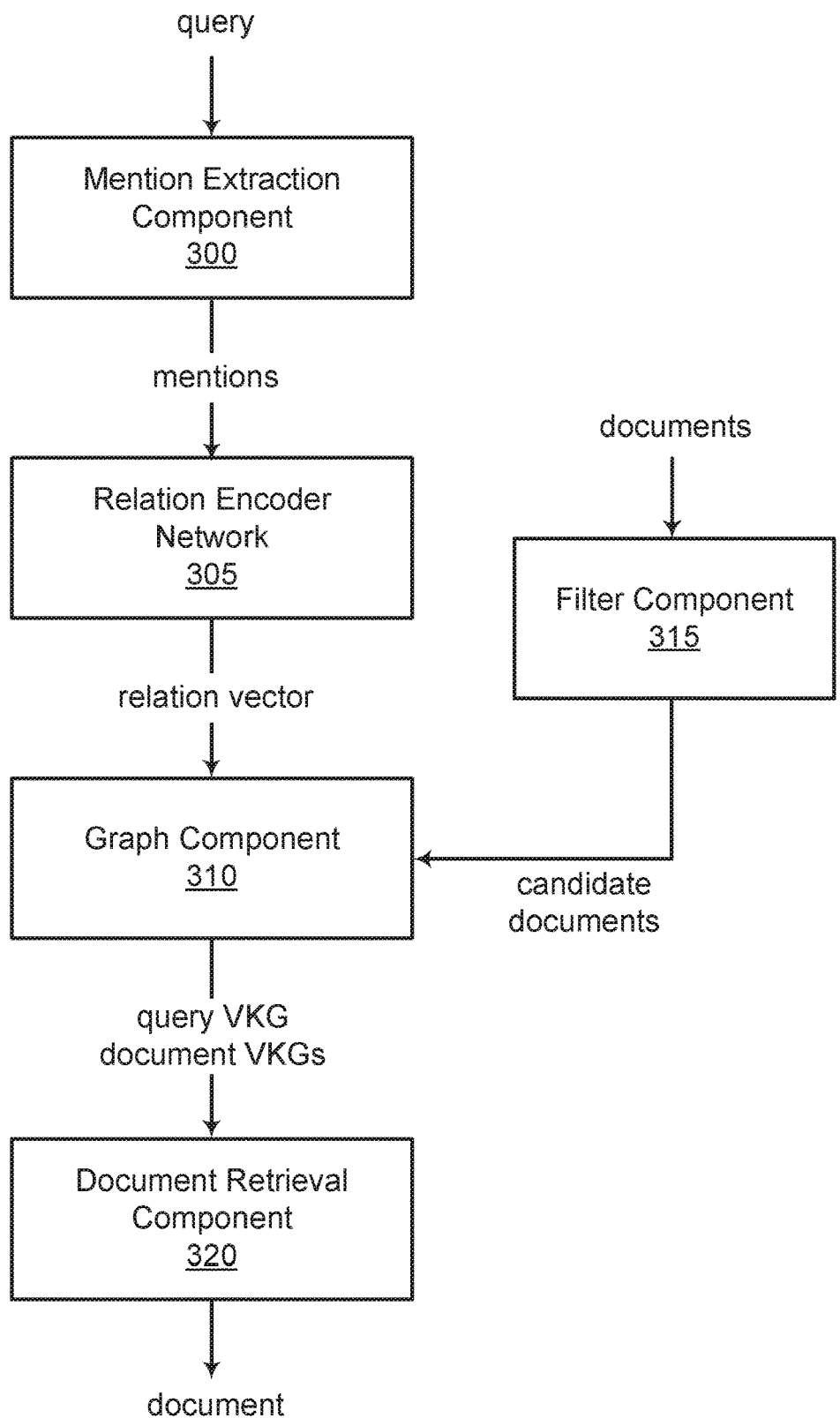
FIG. 3 shows an example of a text processing diagram according to aspects of the present disclosure.

FIG. 3 shows an example of a text processing diagram according to aspects of the present disclosure. The example shown includes mention extraction component 300, relation encoder network 305, graph component 310, filter component 315, and document retrieval component 320.

According to an embodiment shown in FIG. 3, from top to bottom, a query is input to mention extraction component 300, which extracts a set of mentions from the query. Mention extraction component 300 is an example of, or includes aspects of, the corresponding element described with reference to FIG. 2. The set of mentions are then input to relation encoder network 305.

Relation encoder network 305 generates a relation vector between a pair of the set of mentions, where the relation encoder network is trained using a contrastive learning process. Mention pairs from a same document are labeled as positive samples and mention pairs from different documents are labeled as negative samples. Relation encoder network 305 is an example of, or includes aspects of, the corresponding element described with reference to FIGS. 2 and 4.

Graph component 310 combines the set of mentions with the relation vector to obtain a virtual knowledge graph of the query (i.e., query VKG). Graph component 310 is an example of, or includes aspects of, the corresponding element described with reference to FIG. 2.

According to an embodiment, a collection of documents is input to filter component 315. Filter component 315 is configured to select a set of candidate documents from a collection of documents based on a bag-of-words analysis. Filter component 315 performs a bag-of-words analysis on each document in a collection of documents. Filter component 315 selects the set of candidate documents from the collection of documents based on the bag-of-words analysis. Bag-of-words refers to a representation of text that describes occurrences of words within a document. For example, in bag-of-words representation, text is represented as a bag of its words, disregarding grammar and word orderings in the text, but still maintaining multiplicity. Bag-of-words analysis analyze vocabulary of known words and includes a measure of presence of the known words.

According to an embodiment, graph component 310 generates a candidate knowledge graph for each of a set of candidate documents (i.e., document VKGs). Document retrieval component 320 compares the virtual knowledge graph of the query to the candidate knowledge graph for each of the set of candidate documents. Document retrieval component 320 identifies a document corresponding to the query by comparing the virtual knowledge graph of the query to a virtual knowledge graph of the document. Document retrieval component 320 is an example of, or includes aspects of, the corresponding element described with reference to FIG. 2.

Figure 4:
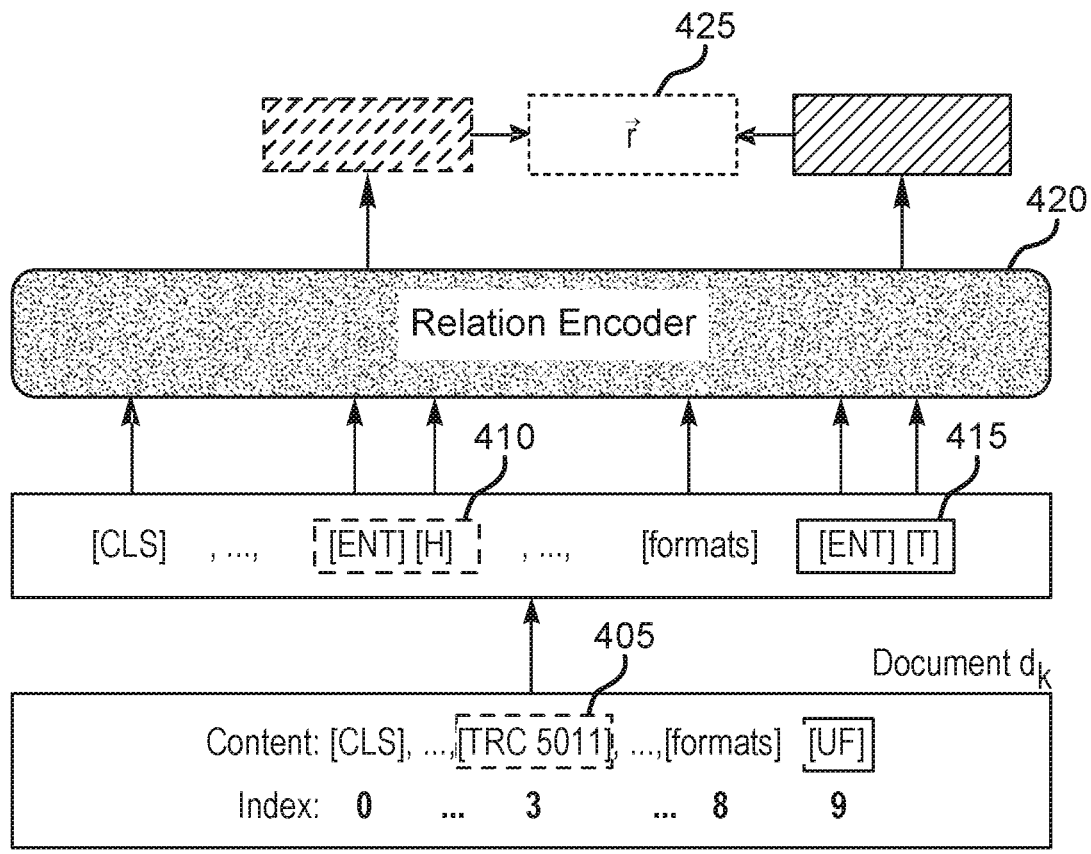
FIG. 4 shows an example of a machine learning model according to aspects of the present disclosure.

FIG. 4 shows an example of a machine learning model 400 according to aspects of the present disclosure. The example shown includes machine learning model 400, mention 405, first set of special tokens 410, second set of special tokens 415, relation encoder network 420, and relation vector 425. Machine learning model 400 is an example of, or includes aspects of, the corresponding element described with reference to FIG. 2. Mention 405 is an example of, or includes aspects of, the corresponding element described with reference to FIG. 6.

At inference time, two mentions are input to relation encoder network 420. Mention, $m_i$ and $m_j$, are text spans in document $d_k$ located from index 3 to 3 and index 9 to 9. Machine learning model 400 masks mention tokens with [ENT] and indicate the head and the tail with head token [H] and tail token [T], respectively. Relation encoder network 420 takes the sequence of tokens as input and computes relation vector 425 of the two mentions.

In some examples, first set of special tokens 410 indicates the head. Second set of special tokens 415 indicates the tail. Head and tail tokens are inserted into the document and the entities are masked with a special token, [ENT]. Relation encoder network 420 takes the sequence of tokens and computes contextualized vector representations of the head and tail tokens.

Then, relation encoder network 420 computes the relation vector from the two vectors with an additional MLP layer. An MLP is a feed forward neural network that typically consists of multiple layers of perceptrons. Each component perceptron layer may include an input layer, one or more hidden layers, and an output layer. Each node may include a nonlinear activation function. An MLP may be trained using backpropagation (i.e., computing the gradient of the loss function with respect to the parameters). Relation encoder network 420 is an example of, or includes aspects of, the corresponding element described with reference to FIGS. 2 and 3.

Text Processing

In FIGS. 5-10, a method, apparatus, and non-transitory computer readable medium for text processing are described. One or more embodiments of the method, apparatus, and non-transitory computer readable medium include receiving a query comprising a natural language expression; extracting a plurality of mentions from the query; generating a relation vector between a pair of the plurality of mentions using a relation encoder network, wherein the relation encoder network is trained using a contrastive learning process where mention pairs from a same document are labeled as positive samples and mention pairs from different documents are labeled as negative samples; combining the plurality of mentions with the relation vector to obtain a virtual knowledge graph of the query; identifying a document corresponding to the query by comparing the virtual knowledge graph of the query to a virtual knowledge graph of the document; and transmitting a response to the query, wherein the response includes a reference to the document.

Some examples of the method, apparatus, and non-transitory computer readable medium further include providing a document search interface. Some examples further include receiving an input from a user via the document search interface, wherein the query is based on the input. Some examples further include displaying the response via the document search interface.

Some examples of the method, apparatus, and non-transitory computer readable medium further include identifying a text delimiter. Some examples further include dividing the query into a plurality of spans based on the text delimiter. Some examples further include computing an entity score for each of the plurality of spans. Some examples further include selecting the plurality of mentions based on the entity score for each of the plurality of spans. Some examples of the method, apparatus, and non-transitory computer readable medium further include determining that the pair corresponds to a same entity based on the relation vector.

Some examples of the method, apparatus, and non-transitory computer readable medium further include identifying the pair from the plurality of mentions, wherein the pair includes a first mention and a second mention. Some examples further include masking the first mention and the second mention using a first entity token and a second entity token, respectively. Some examples further include inserting a head token adjacent to the first mention and a tail token adjacent to the second mention, wherein the relation vector is generated based on the first entity token, the second entity token, the head token, and the tail token.

In some examples, each of the plurality of mentions comprises a document index, a start index, an end index, and a corresponding entity. In some examples, the virtual knowledge graph of the query includes a plurality of nodes corresponding to the plurality of mentions and an edge corresponding to the relation vector. In some examples, the edge comprises a head mention, a tail mention, and the relation vector.

Some examples of the method, apparatus, and non-transitory computer readable medium further include identifying matching mentions in the query and the document based on the virtual knowledge graph of the query and the virtual knowledge graph of the document. Some examples further include computing a similarity score for the query and the document based on the matching mentions, wherein the document is identified based on the similarity score.

Some examples of the method, apparatus, and non-transitory computer readable medium further include computing a candidate knowledge graph for each of a plurality of candidate documents. Some examples further include comparing the virtual knowledge graph of the query to the candidate knowledge graph for each of the plurality of candidate documents, wherein the document is identified based on the comparison.

Some examples of the method, apparatus, and non-transitory computer readable medium further include performing a bag-of-words analysis on each document in a collection of documents. Some examples further include selecting the plurality of candidate documents from the collection of documents based on the bag-of-words analysis.

Figure 5:
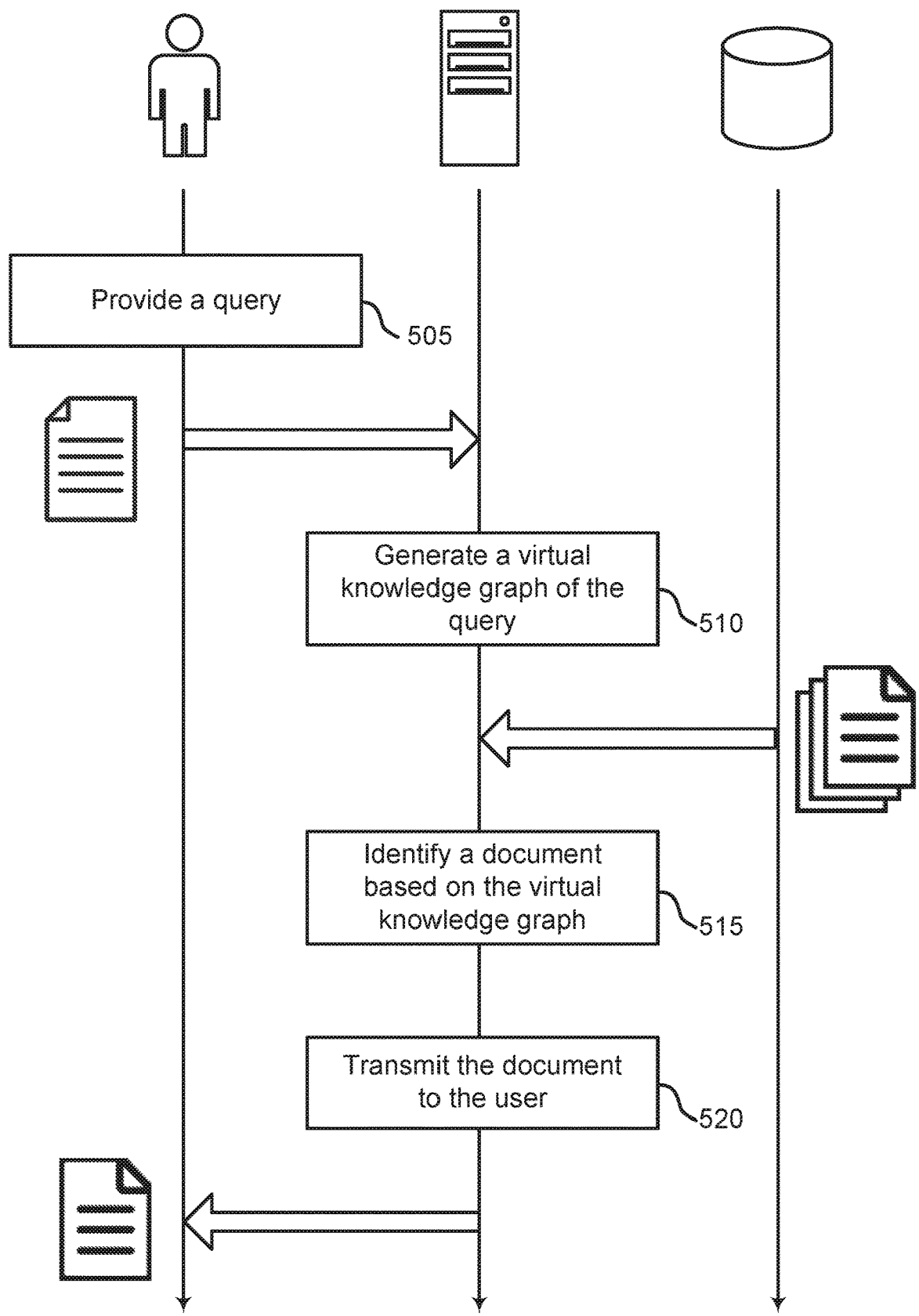
FIG. 5 shows an example of document retrieval according to aspects of the present disclosure.

FIG. 5 shows an example of document retrieval according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 505, the user provides a query. In some cases, the operations of this step refer to, or may be performed by, a user as described with reference to FIG. 1. The query is transmitted to text processing apparatus 200. In some examples, the query is a document, a passage, or a paragraph.

At operation 510, the system generates a virtual knowledge graph of the query. In some cases, the operations of this step refer to, or may be performed by, a text processing apparatus as described with reference to FIGS. 1 and 2. The query is in textual format. Text processing apparatus 200 generates a virtual knowledge graph of the query (i.e., query VKG).

At operation 515, the system identifies a document based on the virtual knowledge graph. In some cases, the operations of this step refer to, or may be performed by, a text processing apparatus as described with reference to FIGS. 1 and 2. Text processing apparatus 200 retrieves a collection of documents from database 120. Text processing apparatus 200 filters the collection of documents to obtain a set of candidate documents. Text processing apparatus 200 constructs a document VKG for each of the candidate documents. In some cases, a document VKG is a graph of mention pairs that appeared in the document. Text processing apparatus 200 finds the most relevant document by comparing the query VKG and the document VKGs.

At operation 520, the system transmits the document to the user. In some cases, the operations of this step refer to, or may be performed by, a text processing apparatus as described with reference to FIGS. 1 and 2.

Figure 6:
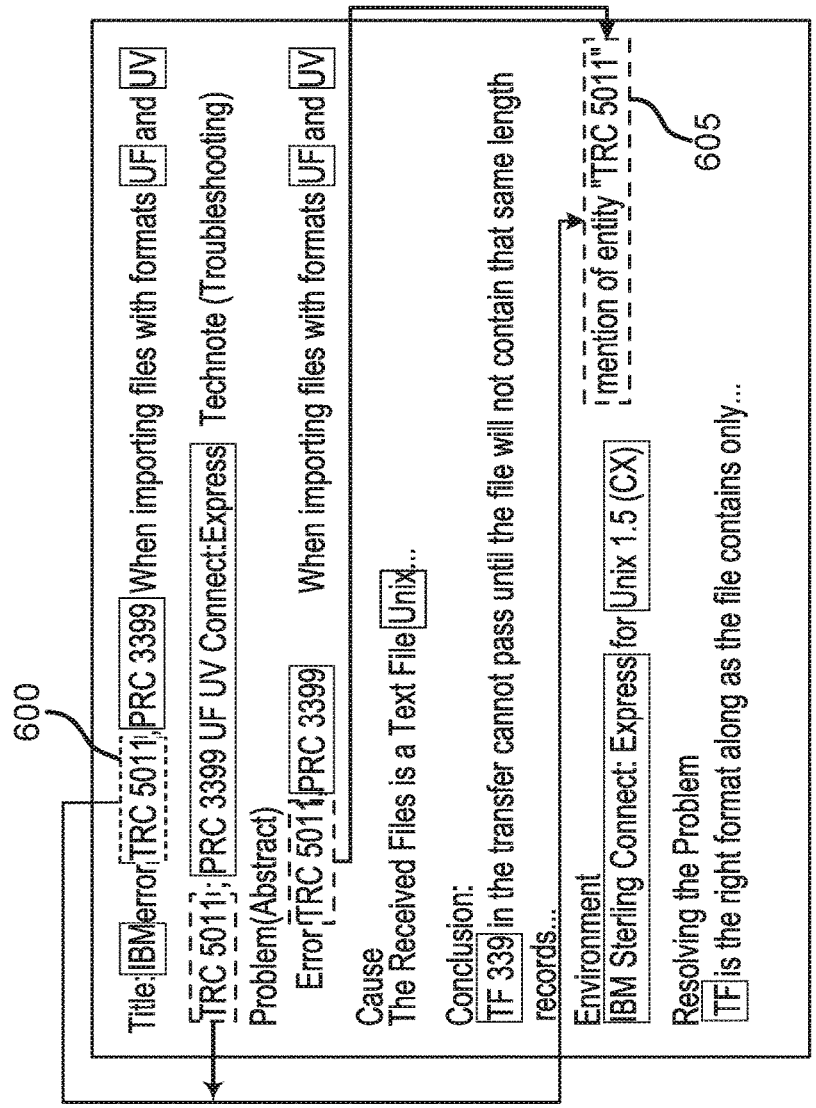
FIG. 6 shows an example of mention and mention of entity according to aspects of the present disclosure.

FIG. 6 shows an example of mention 600 and mention of entity 605 according to aspects of the present disclosure. The example shown includes mention 600 and mention of entity 605. Mention 600 is an example of, or includes aspects of, the corresponding element described with reference to FIG. 4. FIG. 6 shows an example document of the TechQA dataset and mentions in the document. Mention 600 is a text segment that refers to a certain entity. For example, entity "TRC 5011" appears multiple times in this document and each text segment that refers to "TRC 5011" is a mention of entity "TRC 5011".

Figure 7:
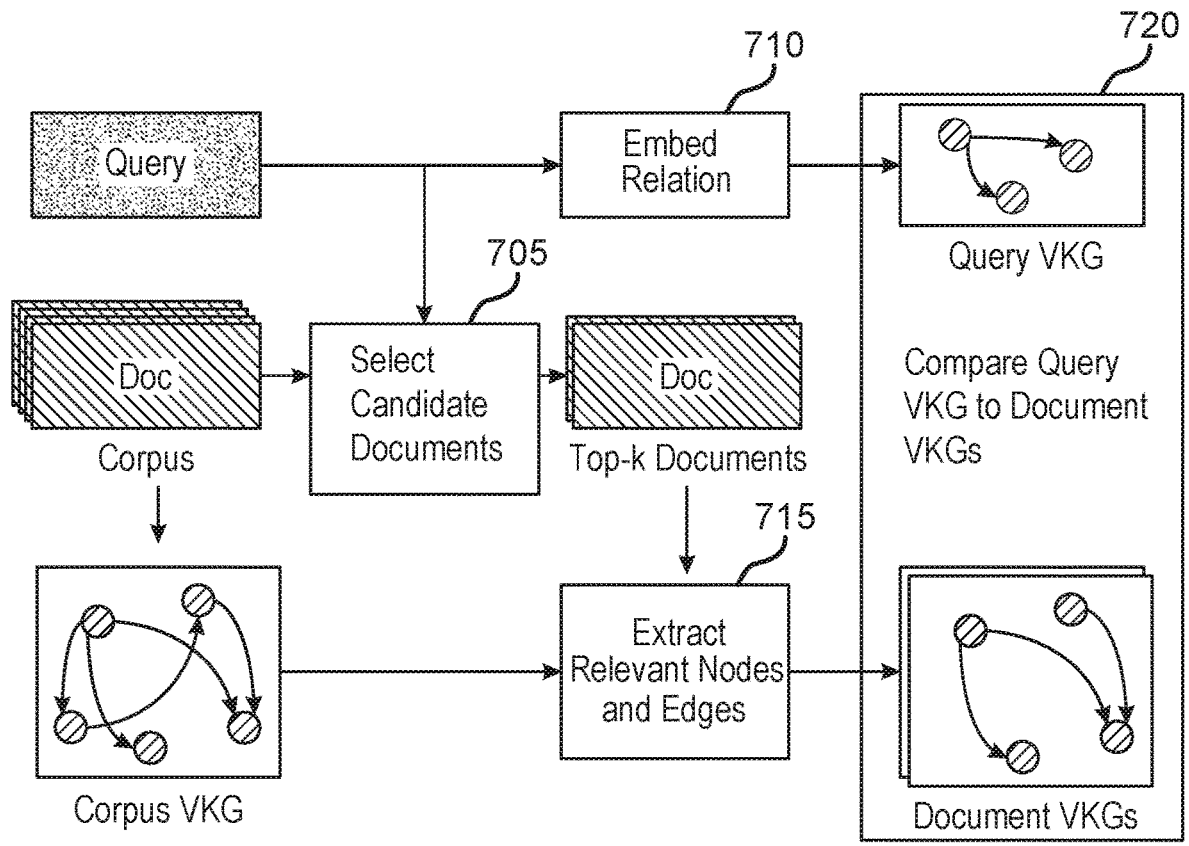
FIG. 7 shows an example of a document retrieval procedure according to aspects of the present disclosure.

FIG. 7 shows an example of a document retrieval procedure according to aspects of the present disclosure. Machine learning model 225 as shown in FIG. 2 uses a virtual knowledge graph to find a document from a collection of documents, where the document is most relevant to a given query. In some examples, these operations are performed by a system including a processor executing a set of codes to control functional elements of an apparatus. FIG. 7 shows an example of a document retrieval process using machine learning model 225. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 705, the system selects candidate documents. In some cases, the operations of this step refer to, or may be performed by, a filter component as described with reference to FIG. 3. The document retrieval process includes selecting top-k relevant documents via a filter component (e.g., BM25). Here, BM is an abbreviation of best matching. In some examples, BM25 is a ranking function used to estimate the relevance of documents to a given search query.

At operation 710, the system embeds relation. In some cases, the operations of this step refer to, or may be performed by, a relation encoder network as described with reference to FIGS. 2-4. According to an embodiment, the system extracts mention pairs that appear in the top-k documents and the corresponding relation vectors from the VKG.

At operation 715, the system extracts relevant nodes and edges. In some cases, the operations of this step refer to, or may be performed by, a graph component as described with reference to FIGS. 2 and 3. According to an embodiment, a graph component constructs a VKG of a given query. Machine learning model 225 then searches and locates the most relevant document from the set of candidate documents by comparing document VKGs and the VKG of the query (i.e., query VKG).

At operation 720, the system compares a virtual knowledge graph of a query to a virtual knowledge graph for each of the set of candidate documents. In some cases, the operations of this step refer to, or may be performed by, a document retrieval component as described with reference to FIGS. 2 and 3. Machine learning model 225 selects top-k documents relevant to the query from a collection of documents. Then, machine learning model 225 constructs a document VKG for each of the candidate documents. A document VKG is a graph of mention pairs that appear in the document. For the top-k documents that are retrieved, machine learning model 225 generates k number of document VKGs. Next, the graph component transforms the query to a VKG of the query. The same relation encoder network used for computing VKG of the corpus is used herein. A document retrieval component finds the most relevant document by comparing the query VKG and the document VKGs. Detail regarding comparing the query VKG and the document VKGs will be described in FIG. 8.

According to an embodiment, machine learning model 225 pre-indexes the corpus VKG. Machine learning model 225 extracts relevant nodes and edges from the corpus VKG for a given query. Machine learning model 225 generates a query VKG based on the query. Machine learning model 225 compares the two VKGs and computes a similarity score for the query and the candidate document. Detail regarding computing a similarity score between a query and a candidate document will be described in FIG. 9.

Figure 8:
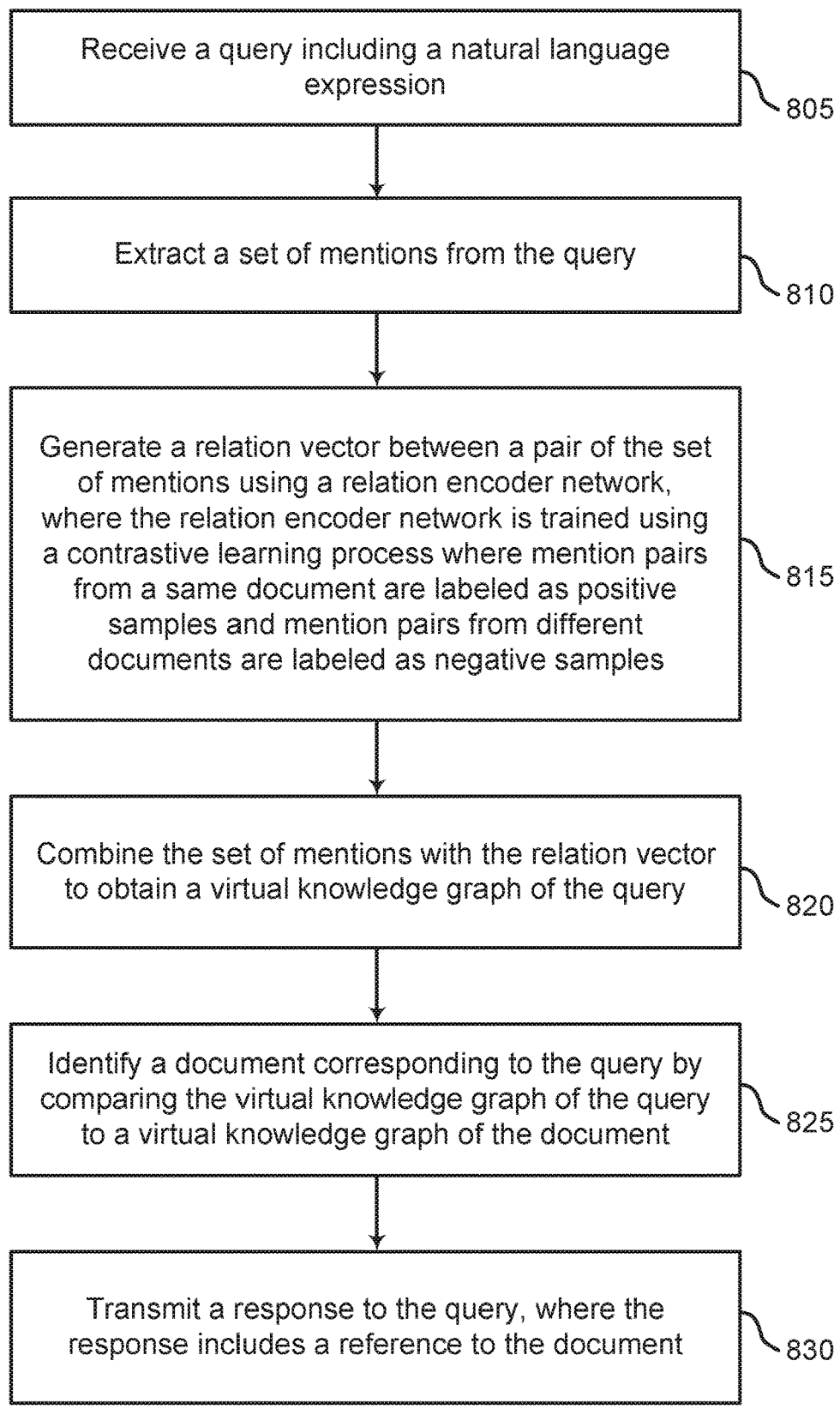
FIG. 8 shows an example of a method for text processing according to aspects of the present disclosure.

FIG. 8 shows an example of a method for text processing according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 805, the system receives a query including a natural language expression. In some cases, the operations of this step refer to, or may be performed by, a document search interface as described with reference to FIG. 1. In some embodiments, machine learning model 225 takes a corpus and outputs a virtual knowledge graph (VKG).

At operation 810, the system extracts a set of mentions from the query. In some cases, the operations of this step refer to, or may be performed by, a mention extraction component as described with reference to FIG. 3.

In some embodiments, corpus $\mathcal{C}$ is a set of documents; $\mathcal{C} := \{d_1, \ldots, d_n\}$. In some cases, a document may be defined as a sequence of tokens; $d_k := [d_k^1, \ldots, d_k^{L_k}]$ where $d_k^j$ is the j'th token of document $d_k$ and $L_k$ is the number of tokens in document $d_k$. An entity extractor constructs a set of entities using e.g., named entity recognition (NER) model such as spaCy, $\varepsilon$ and a set of mentions, $\mathcal{M}$.

In some cases, an entity is a named entity in corpus $\mathcal{C}$. A mention is a text segment in corpus $\mathcal{C}$ that corresponds to an entity in $\varepsilon$. In some examples, the mention is defined as $m_i = \{d_k, a, b, e_j\}$. The mention $m_i$ is a text segment starting from index a and ending at index b in document $d_k$, which corresponds to entity $e_j$.

Referring to an example in FIG. 6, highlighted text segments (text surrounded by either a solid-line box or a dash-line box) are the mentions. There are one or more mentions for each entity. For example, entity "TRC 5011" appears multiple times in a document. Each text segment that refers to entity "TRC 5011" is a mention of the entity.

At operation 815, the system generates a relation vector between a pair of the set of mentions using a relation encoder network, where the relation encoder network is trained using a contrastive learning process where mention pairs from a same document are labeled as positive samples and mention pairs from different documents are labeled as negative samples. In some cases, the operations of this step refer to, or may be performed by, a relation encoder network as described with reference to FIGS. 2-4. The relation encoder network takes a mention pair and computes the relation vector as follows:

$$\vec{r}_{i,j} = RE(m_i = \{d_k, a, b, m\}, m_j = \{d_k, c, d, e_v\}) \quad (1)$$

where $(m_i = (d_k, a, b, e_u), m_j = (d_k, c, d, e_v))$ is a mention pair.

Detail regarding constructing a sequence of tokens that represents the direction between the two mentions will be described in greater detail in FIG. 10. In some examples, a mention pair corresponds to the same entity. Alternatively, a mention pair may correspond to different entities.

At operation 820, the system combines the set of mentions with the relation vector to obtain a virtual knowledge graph of the query. In some cases, the operations of this step refer to, or may be performed by, a graph component as described with reference to FIGS. 2 and 3.

A virtual knowledge graph is a directed graph comprising mentions and their relations. The relations are represented by relation vectors. An edge of the VKG is defined as follows:

$$(m_a, m_b, \vec{r}_j) \quad (2)$$

where a directed edge connects mention $m_a$ to $m_b$, and $\vec{r}_j$ is the relation vector of the mention pair.

Mention $m_a$ is called the head, and $m_b$ is called the tail. The machine learning model constructs a virtual knowledge graph through connecting relevant mentions and computing relation vectors of edges. In some cases, two mentions are relevant if they appear in the same document and connect the two mentions with directed edges in both directions. Thus, for a given document with n mentions, there are $n^2$ combinations of mention pairs and $n^2$ more mentions pairs because the machine learning model connects mentions with directed edges in both directions.

At operation 825, the system identifies a document corresponding to the query by comparing the virtual knowledge graph of the query to a virtual knowledge graph of the document. In some cases, the operations of this step refer to, or may be performed by, a document retrieval component as described with reference to FIGS. 2 and 3. The query VKG and the document VKG include multiple mention pairs as follows:

$$VKG_q = \{(m_h, m_t, \vec{r})_i\}_{i=1}^k \quad (3)$$

$$VKG_d = \{(m_h, m_t, \vec{r})_i\}_{i=1}^n \quad (4)$$

where $VKG_q$ is the query VKG and $VKG_d$ is the document VKG.

Machine learning model 225 computes the similarity score between two VKGs as follows:

$$\text{similarity}(q, d) = \sum_{\substack{(m_h^q, m_t^q, \vec{r}^q) \in KTq \\ (m_h^d, m_t^d, \vec{r}^d) \in KTd}} \mathbb{1}\left((m_h^d, m_t^d) = (m_h^q, m_t^q)\right) \vec{r}^{q\top} \vec{r}^d \quad (5)$$

where $\mathbb{1}$ is an indicator function that maps true condition to one and false condition to zero.

At operation 830, the system transmits a response to the query, where the response includes a reference to the document. In some cases, the operations of this step refer to, or may be performed by, a machine learning model as described with reference to FIGS. 2 and 4.

Figure 9:
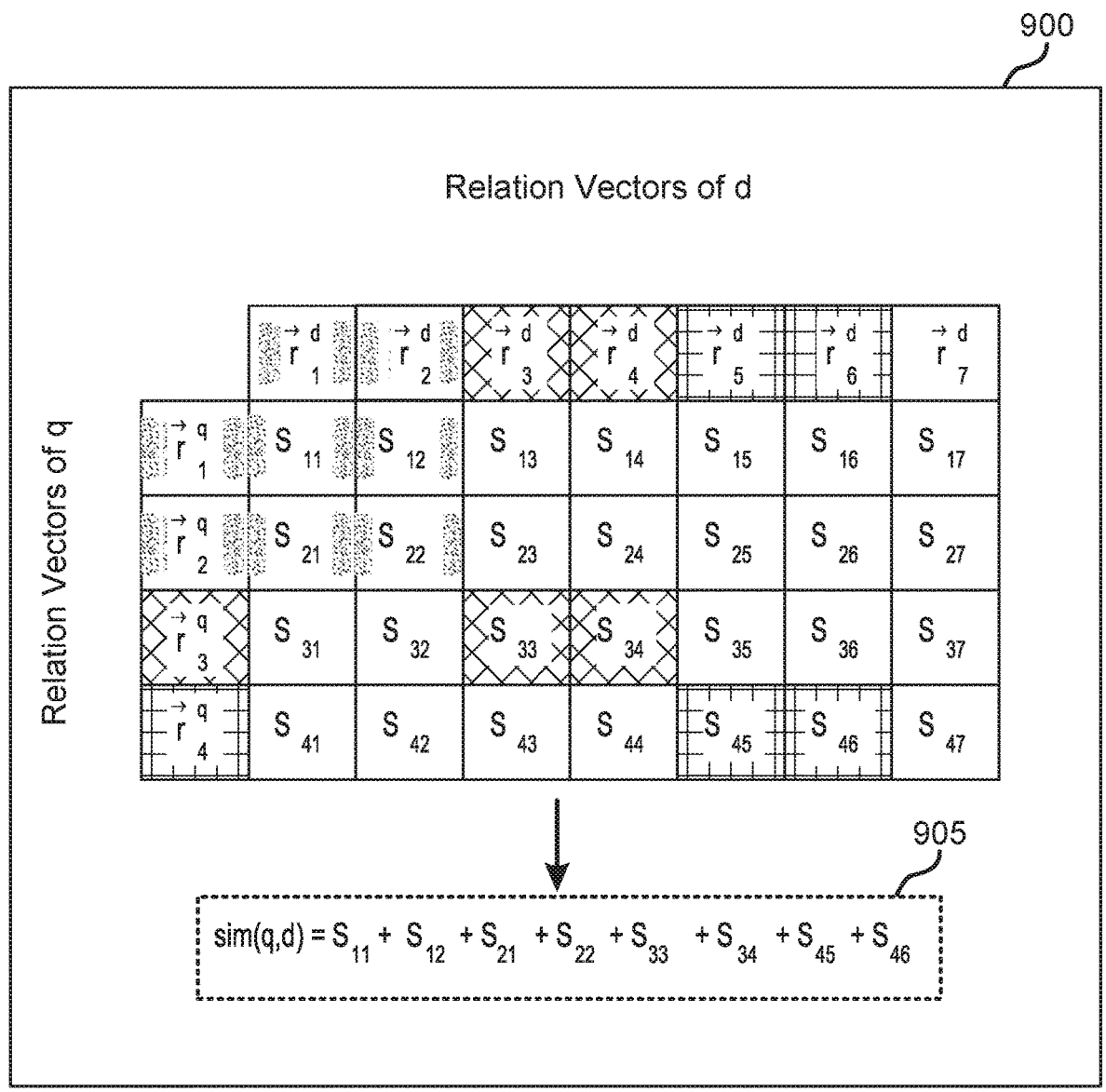
FIG. 9 shows an example of relation vectors according to aspects of the present disclosure.

FIG. 9 shows an example of relation vectors 900 according to aspects of the present disclosure. The example shown includes relation vectors 900 and similarity score 905. Relation vectors of d refers to relation vectors of a document. Relation vectors of q refers to relation vectors of a query. Color-coding (e.g., different line patterns as shown in FIG. 9) indicates the relation vectors that share the same entity pairs.

According to an embodiment, the relation encoder network computes relation vectors of mention pairs connected in a virtual knowledge graph. The relation encoder network is configured to embed mention pairs into a similar vector space if they are in similar relation. Machine learning model 225 identifies matching mentions in the query and the document based on the virtual knowledge graph of the query and the virtual knowledge graph of the document. Machine learning model 225 computes a similarity score for the query and the document based on the matching mentions, where the document is identified based on the similarity score. According to an example shown in FIG. 9, the similarity score between document d and query q is computed as follows:

$$sim(q,d) = s_{11} + s_{12} + s_{21} + s_{22} + s_{33} + s_{34} + s_{45} + s_{46} \qquad (6)$$

Figure 10:
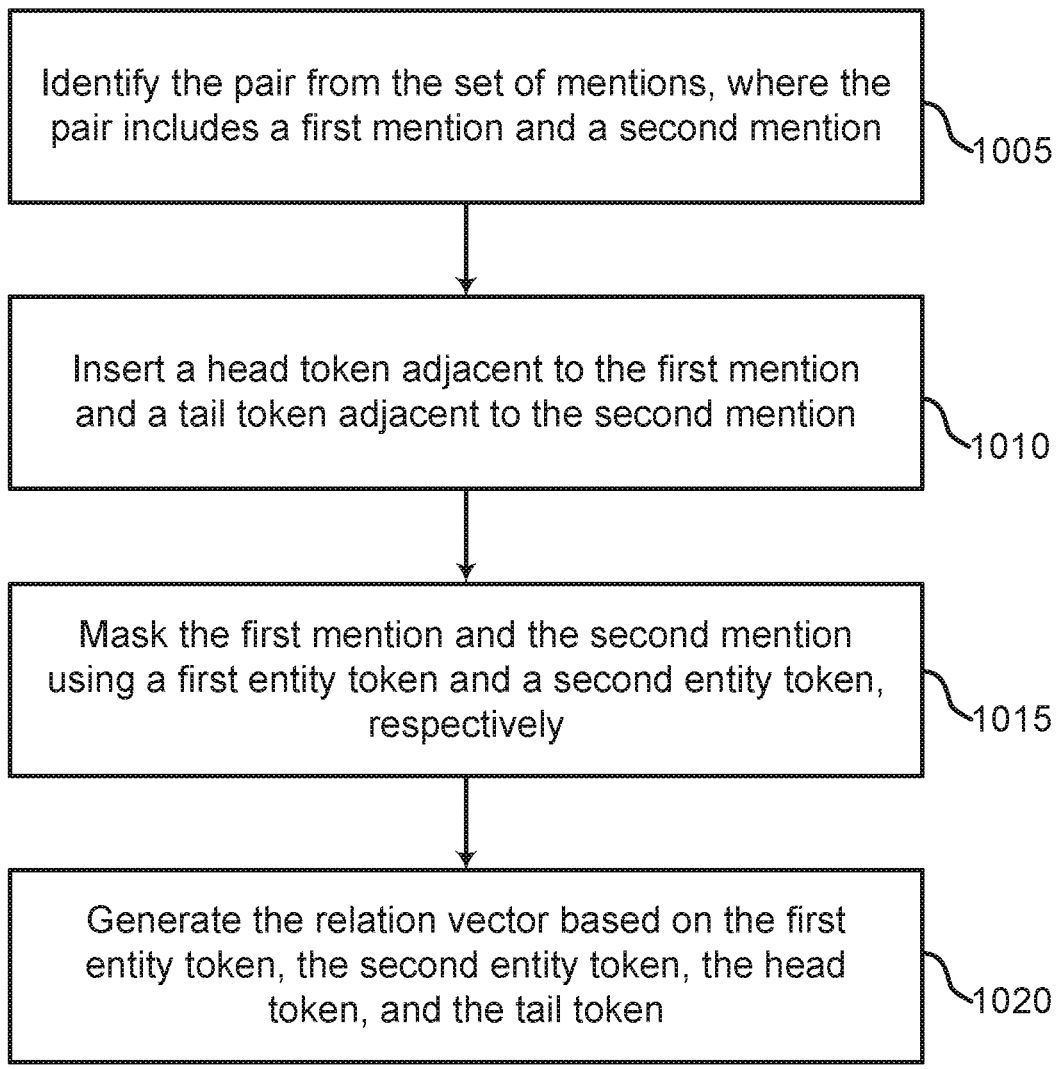
FIG. 10 shows an example of a method for generating a relation vector according to aspects of the present disclosure.

FIG. 10 shows an example of a method for generating a relation vector according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1005, the system identifies the pair from the set of mentions, where the pair includes a first mention and a second mention. In some cases, the operations of this step refer to, or may be performed by, a relation encoder network as described with reference to FIGS. 2-4.

At operation 1010, the system inserts a head token adjacent to the first mention and a tail token adjacent to the second mention. In some cases, the operations of this step refer to, or may be performed by, a relation encoder network as described with reference to FIGS. 2-4.

In some examples, the relation encoder network may take pre-processed mention pairs as an input. The pre-processing operation includes adding special tokens to the head and the tail mentions to indicate their direction and masking the mentions. For a given mention pair, $(m_i = (d_k, a, b, e_u), m_j = (d_k, c, d, e_v))$, the machine learning model represents the two mentions in document $d_k$ as follows:

$$(m_i, m_j) = [d_k^1, \ldots, e_u, \ldots, e_v, \ldots, d_k^{L_k}] \qquad (7)$$

where $e_v$ and $e_u$ are the tokens in document $d_k$ corresponding to the two mentions.

Next, head and tail tokens, [H] and [T], are placed in between the mentions as follows:

$$[d_k^1, \ldots e_u, [H], \ldots, e_v, [T], \ldots, d_k^{L_k}] \qquad (8)$$

At operation 1015, the system masks the first mention and the second mention using a first entity token and a second entity token, respectively. In some cases, the operations of this step refer to, or may be performed by, a relation encoder network as described with reference to FIGS. 2-4. According to an embodiment, a sequence of tokens represents the direction between the two mentions. The relation encoder network predicts a same relation vector for the opposite input, $(m_j, m_i)$, when there is no head and tail tokens. Mention masking enables the relation encoder network to compute the relation vector based on the context of the mention pairs. The machine learning model masks the mentions as follows:

$$[d_k^1, \ldots, [ENT], [H], \ldots, [ENT], [T], \ldots, d_k^{L_k}] \qquad (9)$$

At operation 1020, the system generates the relation vector based on the first entity token, the second entity token, the head token, and the tail token. In some cases, the operations of this step refer to, or may be performed by, a relation encoder network as described with reference to FIGS. 2-4.

Training and Evaluation

Figure 11:
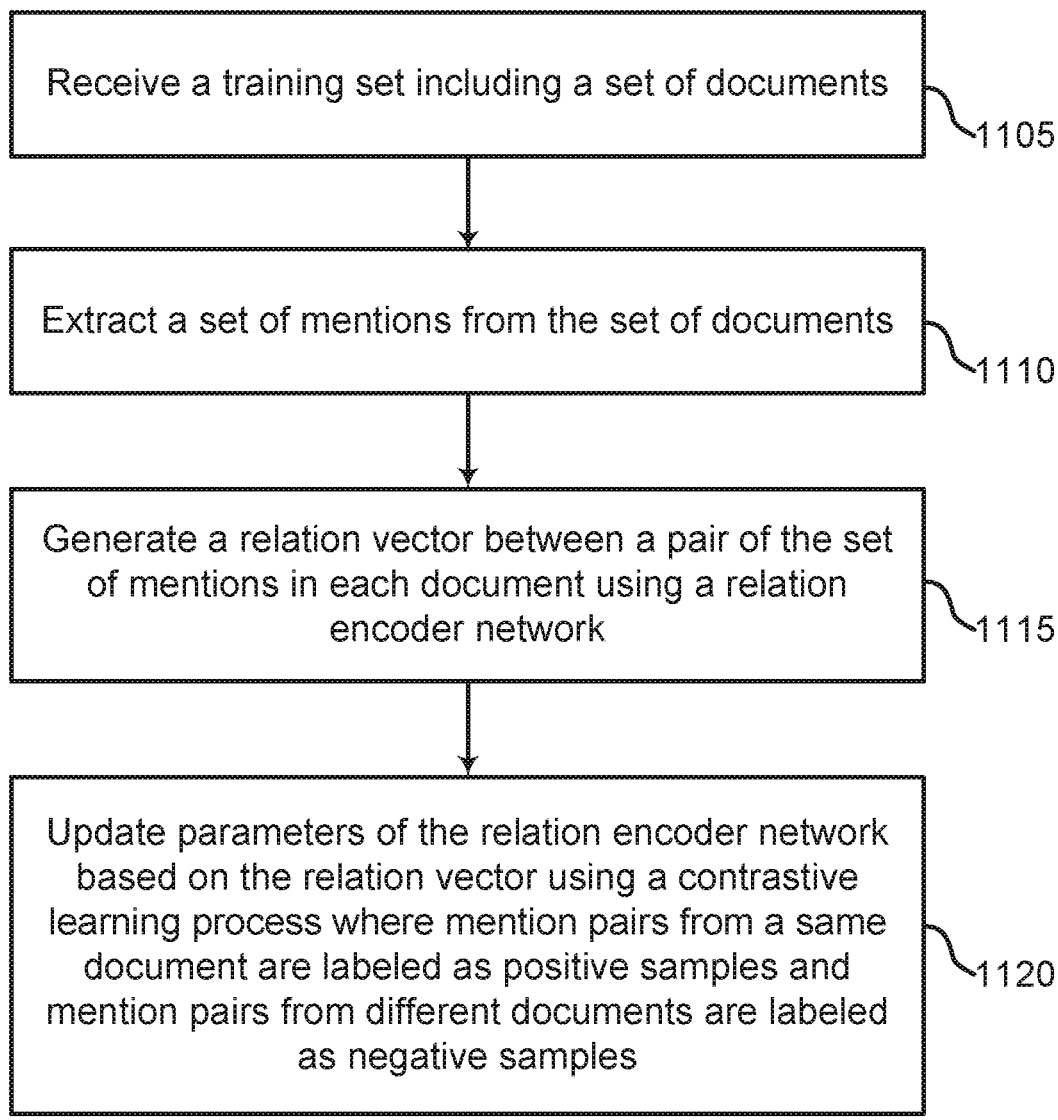
FIG. 11 shows an example of a method for training a machine learning model according to aspects of the present disclosure.
Figure 12:
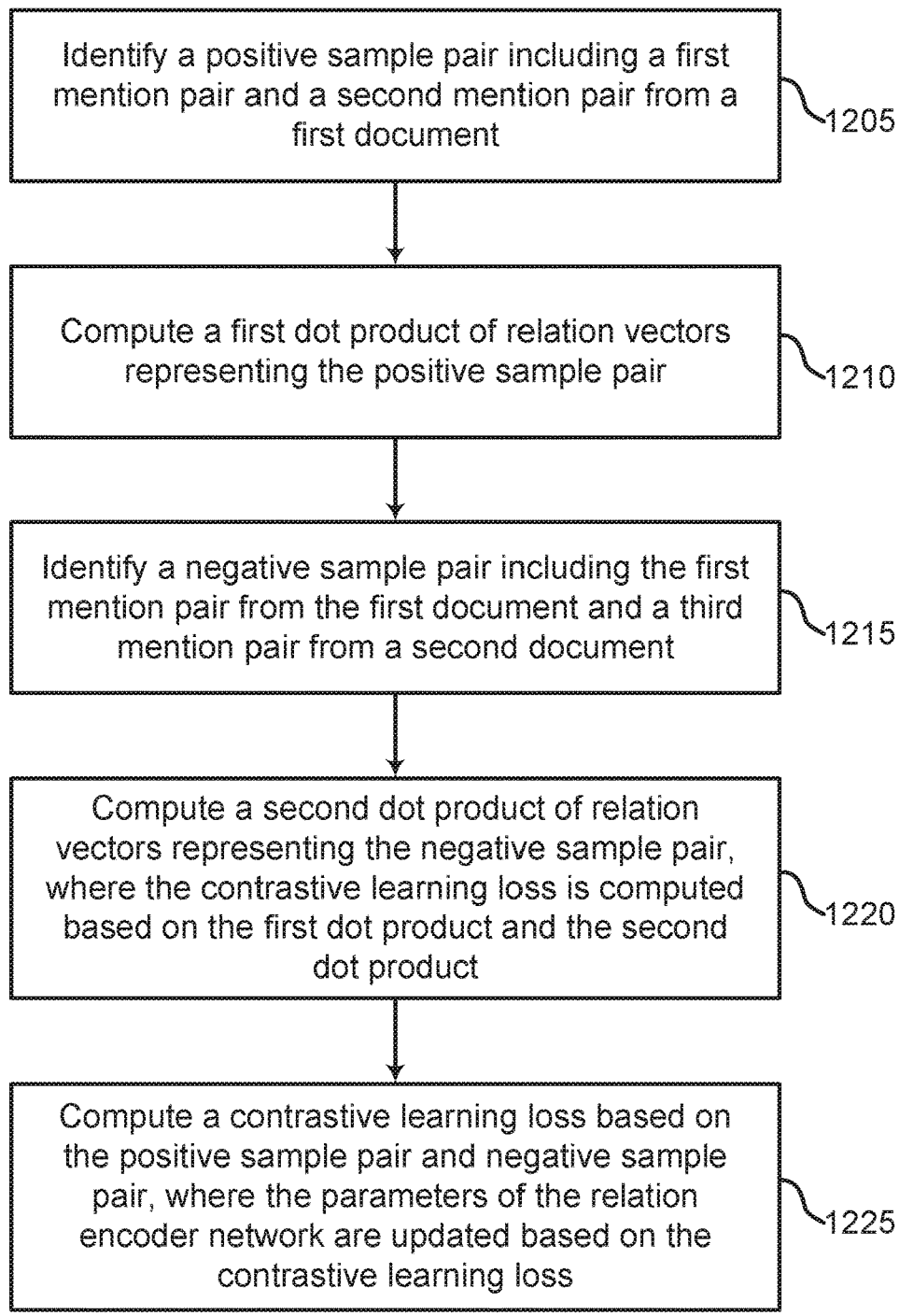
FIG. 12 shows an example of a method for training a relation encoder network using contrastive learning according to aspects of the present disclosure.

In FIGS. 11-12, a method, apparatus, and non-transitory computer readable medium for training a machine learning model are described. One or more embodiments of the method, apparatus, and non-transitory computer readable medium include receiving a training set including a plurality of documents; extracting a plurality of mentions from the plurality of documents; generating a relation vector between a pair of the plurality of mentions in each document using a relation encoder network; and updating parameters of the relation encoder network based on the relation vector using a contrastive learning process where mention pairs from a same document are labeled as positive samples and mention pairs from different documents are labeled as negative samples.

Some examples of the method, apparatus, and non-transitory computer readable medium further include identifying a positive sample pair comprising a first mention pair and a second mention pair from a first document. Some examples further include identifying a negative sample pair comprising the first mention pair from the first document and a third mention pair from a second document. Some examples further include computing a contrastive learning loss based on the positive sample pair and negative sample pair, wherein the parameters of the relation encoder network are updated based on the contrastive learning loss.

Some examples of the method, apparatus, and non-transitory computer readable medium further include computing a first dot product of relation vectors representing the positive sample pair. Some examples further include computing a second dot product of relation vectors representing the negative sample pair, wherein the contrastive learning loss is computed based on the first dot product and the second dot product.

Some examples of the method, apparatus, and non-transitory computer readable medium further include receiving ground truth training data associating the pair of the plurality of mentions with a common entity. Some examples further include computing a cross-entropy loss based on the relation vector and the ground truth training data, wherein the parameters of the relation encoder network are updated based on the cross-entropy loss.

FIG. 11 shows an example of a method for training a machine learning model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various sub steps, or are performed in conjunction with other operations.

Supervised learning is one of three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances. In other words, the learning algorithm generalizes from the training data to unseen examples.

Accordingly, during a training process, the parameters and weights of the machine learning model are adjusted to increase the accuracy of the result (e.g., attempting to minimize a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

The term loss function refers to a function that impacts how a machine learning model is trained in a supervised learning model. Specifically, during each training iteration, the output of the model is compared to the known annotation information in the training data. The loss function provides a value for how close the predicted annotation data is to the actual annotation data. After computing the loss function, the parameters of the model are updated accordingly and a new set of predictions are made during the next iteration.

At operation 1105, the system receives a training set including a set of documents. In some cases, the operations of this step refer to, or may be performed by, a training component as described with reference to FIG. 2.

At operation 1110, the system extracts a set of mentions from the set of documents. In some cases, the operations of this step refer to, or may be performed by, a training component as described with reference to FIG. 2.

At operation 1115, the system generates a relation vector between a pair of the set of mentions in each document using a relation encoder network. In some cases, the operations of this step refer to, or may be performed by, a training component as described with reference to FIG. 2.

At operation 1120, the system updates parameters of the relation encoder network based on the relation vector using a contrastive learning process where mention pairs from a same document are labeled as positive samples and mention pairs from different documents are labeled as negative samples. In some cases, the operations of this step refer to, or may be performed by, a training component as described with reference to FIG. 2.

According to some embodiments, a distant-supervision method is used to construct a virtual knowledge graph from domain-specific documents. Distant-supervision methods heuristically annotate mention pairs in the same relation and train the relation encoder network to maximize the similarity between mention pairs in the same relation. Training the relation encoder network using contrastive learning will be described in greater detail in FIG. 12.

FIG. 12 shows an example of a method for training a relation encoder network using contrastive learning according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Contrastive learning refers to a type of machine learning in which a model is trained using the selection of positive and negative sample pairs. Contrastive learning can be used in either a supervised or unsupervised (e.g., self-supervised) training context. A loss function for a contrastive learning model can encourage a model to generate similar results for positive sample pairs, and dissimilar results for negative sample pairs. In self-supervised examples, positive samples can be generated automatically from input data (e.g., by cropping or transforming an existing image).

At operation 1205, the system identifies a positive sample pair including a first mention pair and a second mention pair from a first document. In some cases, the operations of this step refer to, or may be performed by, a training component as described with reference to FIG. 2. In some examples, two entities of a mention-pair appear in the same document. A positive sample pair is two mention-pairs that appear in the same document. That is, the four mentions appear in the same document.

At operation 1210, the system computes a first dot product of relation vectors representing the positive sample pair. In some cases, the operations of this step refer to, or may be performed by, a training component as described with reference to FIG. 2.

At operation 1215, the system identifies a negative sample pair including the first mention pair from the first document and a third mention pair from a second document. In some cases, the operations of this step refer to, or may be performed by, a training component as described with reference to FIG. 2. In some examples, a negative pair is two mention-pairs that appear in different documents. That is, a first document contains the two mentions of one of the mention-pairs, a second document contains the two mentions of the other mention-pair, where the first document and the second document are different documents.

At operation 1220, the system computes a second dot product of relation vectors representing the negative sample pair, where the contrastive learning loss is computed based on the first dot product and the second dot product. In some cases, the operations of this step refer to, or may be performed by, a training component as described with reference to FIG. 2.

At operation 1225, the system computes a contrastive learning loss based on the positive sample pair and negative sample pair, where the parameters of the relation encoder network are updated based on the contrastive learning loss. In some cases, the operations of this step refer to, or may be performed by, a training component as described with reference to FIG. 2.

According to some embodiments, training component 220 applies distant-supervision method for domain-specific documents. In domain-specific question answering (QA), mention pairs may be in different relations, and the relation may vary depending on the context of the document. That is, it may not be correct to assume that mention pairs are in the same relation if they share the same entity pair. Relation encoder network can predict similar relation vectors for mention pairs with the same entity pair even they are in different relations. The context of mention pairs is more important than the entities they refer to.

According to some embodiments, mention-pairs are in the same relation if they appear in the same document. The relation encoder network is trained as follows. For a given mention-pair, $p=(m_i, m_j)$, the positive sample ($p^+$) is a mention pair that appears in the same document and the negative sample is a mention pair in a different document. The relation encoder network is trained using the following loss function:

$$L(p, p^+, p_1^-, \ldots, p_{\#neg}^-) = -\log\left(\frac{e^{sim(p,p^+)}}{e^{sim(p,p^+)} + \sum_{i=1}^{\#neg} e^{sim(p,p_i^-)}}\right) \quad (10)$$

where sim function is the dot product of the two relation vectors; $sim(p_1, p_2) = \vec{r}_{p_1}^T \vec{r}_{p_2}$.

Performance of apparatus, systems and methods of the present disclosure have been evaluated, and results indicate embodiments of the present disclosure have obtained increased performance over existing technology. Example experiments demonstrate that text processing apparatus 200 outperforms conventional systems.

The experimental results demonstrate, first, text processing apparatus 200 outperforms baselines in a zero-shot setting. Second, the distant-supervision method for training relation encoder network 235 increases model performance. Third, text processing apparatus 200 generates graph representation of a corpus and relation vectors, which result in zero-shot performance of text processing apparatus 200.

Some example experiments show zero-shot domain-specific document retrieval performance of text processing apparatus 200 and baselines. These experiments indicate that constructing a VKG is more effective than transfer learning methods when training dataset is not available. The distant supervision method for training relation encoder network 235 increases model performance.

Efficacy of VKG in a zero-shot setting is demonstrated in some example experiments showing performance of three types of models. Type "L" represents lexical retrievers, type "D" represents dense retrievers, and type "D+L" represents ensemble models of type "D" and type "L." The ensemble models compute a similarity score of each document as follows:

$$Score(d_i) = -(Rank_{Dense}(d_i) + \lambda \cdot Rank_{BM25}(d_i)) \quad (11)$$

where $Rank_{Dense}(d_i)$ and $Rank_{BM25}(d_i)$ are ranks of document $d_i$ predicted by a dense retriever and BM25. $\lambda$ is a weight for BM25, and $\lambda$ is set to 1.0.

The results of type "D" models show that VKG construction increases retrieval performance. The domain-adaptation method (Adapt) significantly underperforms than text processing apparatus 200 by 34.3% in R@1. Training retrievers on data in another domain (DPR) results in 22.5% lower performance than text processing apparatus 200 in R@1.

In some examples, Recall@k (R@k) and mean reciprocal rank (MRR) are evaluation metrics for document retrieval tasks. R@k measures the proportion of the model's predictions where top-k retrieved documents contain the ground truth document. MRR is defined with the predicted rank of the ground truth document as follows:

$$MRR = \frac{1}{n}\sum_{i=1}^{n}\frac{1}{r_i} \quad (12)$$

where n is the number of predictions, $r_i$ is the predicted rank of the ground truth document of i'th query.

In some examples, hyper-parameter settings are as follows. Adam optimizer with a warmup ratio of 0.1 is used and learning rate is set to $2\times10^{-5}$ for machine learning model 225 and baselines. The validation score is used to obtain an optimal checkpoint for the models. Relation encoder network 235 is trained on a pre-trained BERT-large model. In some examples, the relation encoder network is trained with a batch size of 128 for two epochs. The max length of the relation encoder network is set to 128, and the number of negative samples is set to 2. A bi-encoder (e.g., RoBERTa) is trained with a batch size of 32 for twenty epochs and adapt with a batch size of 80 for ten epochs. The maximum sequence length is set to 512 for the baselines.

According to an embodiment, a VKG includes graph representation of a corpus and relation vectors. Ablation study is conducted on TechQA in different settings, i.e., a machine learning model, a model without using the relation vectors (also referred to as "w/o relation embedding"), and a model without using the graph structure (also referred to as "w/o mention pairs"). According to an embodiment, "w/o relation embedding" is a model that uses $\vec{1}$ (a vector that all elements are one) for relation vectors in the VKG. Referring to FIG. 9, relation vectors are replaced with $\vec{1}$. This is equivalent to using the number of overlapping mention pairs as the similarity between a question and a document.

According to an embodiment, "w/o mention pairs" is a model without mention pair matching. Values in the similarity matrix (FIG. 9) are used to compute the question-document similarity.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method for text processing, comprising:
   receiving a query comprising a natural language expression;
   extracting a plurality of query mentions from the query;
   generating a virtual knowledge graph of the query by masking each of the plurality of query mentions and generating, using a relation encoder network, a query relation vector between a pair of the plurality of query mentions;
   identifying a virtual knowledge graph of a document including a document relation vector between a pair of a plurality of document mentions;

computing a graph similarity score between the virtual knowledge graph of the query and the virtual knowledge graph of the document based on the query relation vector, the document relation vector, and a match between the pair of the plurality of document mentions of the document relation vector and the pair of the plurality of query mentions of the query relation vector by computing a relation similarity between the query relation vector and the document relation vector based on the match; and transmitting a response to the query based on the document and the graph similarity score.

2. The method of claim 1, further comprising:
providing a document search interface;
receiving an input from a user via the document search interface, wherein the query is based on the input; and
displaying the response via the document search interface.

3. The method of claim 1, further comprising:
identifying a text delimiter;
dividing the query into a plurality of spans based on the text delimiter;
computing an entity score for each of the plurality of spans; and
selecting the plurality of query mentions based on the entity score for each of the plurality of spans.

4. The method of claim 1, further comprising:
determining that the pair of the plurality of query mentions corresponds to a same entity based on the query relation vector.

5. The method of claim 1, further comprising:
identifying the pair from the plurality of query mentions, wherein the pair includes a first mention and a second mention;
masking the first mention and the second mention using a first entity token and a second entity token, respectively; and
inserting a head token adjacent to the first mention and a tail token adjacent to the second mention, wherein the query relation vector is generated based on the first entity token, the second entity token, the head token, and the tail token.

6. The method of claim 1, wherein:
each of the plurality of query mentions comprises a document index, a start index, an end index, and a corresponding entity.

7. The method of claim 1, wherein:
the virtual knowledge graph of the query includes a plurality of nodes corresponding to the plurality of query mentions and an edge corresponding to the query relation vector.

8. The method of claim 7, wherein:
the edge comprises a head mention, a tail mention, and the query relation vector.

9. The method of claim 1, further comprising:
identifying matching mentions in the query and the document based on the virtual knowledge graph of the query and the virtual knowledge graph of the document; and
computing the graph similarity score for the query and the document based on the matching mentions, wherein the document is identified based on the graph similarity score.

10. The method of claim 1, further comprising:
computing a candidate knowledge graph for each of a plurality of candidate documents; and
comparing the virtual knowledge graph of the query to the candidate knowledge graph for each of the plurality of candidate documents, wherein the document is identified based on the comparison.

11. The method of claim 10, further comprising:
performing a bag-of-words analysis on each document in a collection of documents; and
selecting the plurality of candidate documents from the collection of documents based on the bag-of-words analysis.

12. A method for training a machine learning model, comprising:
receiving a training set including a plurality of documents;
extracting a plurality of mentions from the plurality of documents;
generating, using a relation encoder network, a relation vector representing a relation between a pair of the plurality of mentions in each document; and
updating parameters of the relation encoder network based on the relation vector using a contrastive learning process where mention pairs from a same document are labeled as positive samples and mention pairs from different documents are labeled as negative samples.

13. The method of claim 12, further comprising:
identifying a positive sample pair comprising a first mention pair and a second mention pair from a first document;
identifying a negative sample pair comprising the first mention pair from the first document and a third mention pair from a second document; and
computing a contrastive learning loss based on the positive sample pair and the negative sample pair, wherein the parameters of the relation encoder network are updated based on the contrastive learning loss.

14. The method of claim 13, further comprising:
computing a first dot product of relation vectors representing the positive sample pair; and
computing a second dot product of relation vectors representing the negative sample pair, wherein the contrastive learning loss is computed based on the first dot product and the second dot product.

15. The method of claim 12, further comprising:
receiving ground truth training data associating the pair of the plurality of mentions with a common entity; and
computing a cross-entropy loss based on the relation vector and the ground truth training data, wherein the parameters of the relation encoder network are updated based on the cross-entropy loss.

16. An apparatus for text processing, comprising:
at least one processor; and
at least one memory including instructions executable by the at least one processor to:
extract a plurality of query mentions from a query;
generate a virtual knowledge graph of the query by masking each of the plurality of query mentions and generating, using a relation encoder network, a query relation vector between a pair of the plurality of query mentions;
identify a virtual knowledge graph of a document including a document relation vector between a pair of a plurality of document mentions;
compute a graph similarity score between the virtual knowledge graph of the query and the virtual knowledge graph of the document based on the query relation vector, the document relation vector, and a match between the pair of the plurality of document mentions of the document relation vector and the pair of the plurality of query mentions of the query relation vector by computing a relation similarity between the query relation vector and the document relation vector based on the match; and transmit a response to the query based on the document and the graph similarity score.

17. The apparatus of claim 16, further comprising instructions executable by the at least one processor to:

compute a contrastive learning loss and to update parameters of the relation encoder network based on the contrastive learning loss.

18. The apparatus of claim 16, further comprising instructions executable by the at least one processor to:

select a plurality of candidate documents from a collection of documents based on a bag-of-words analysis.

19. The apparatus of claim 16, further comprising instructions executable by the at least one processor to:

receive the query from a user and to display the document.

20. The apparatus of claim 16, wherein:

the relation encoder network comprises a transformer architecture.

* * * * *